Patented Jan. 6, 1948

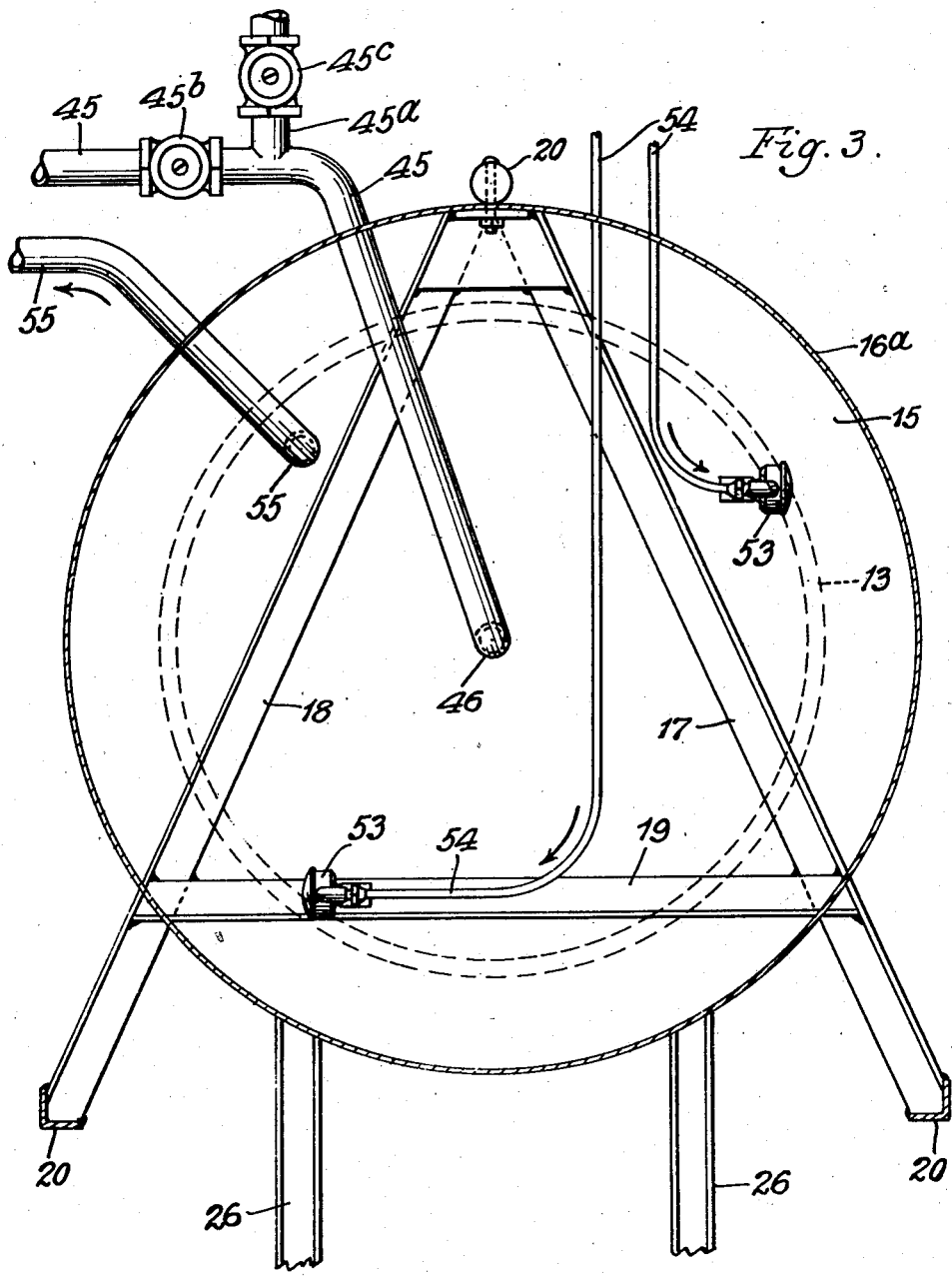

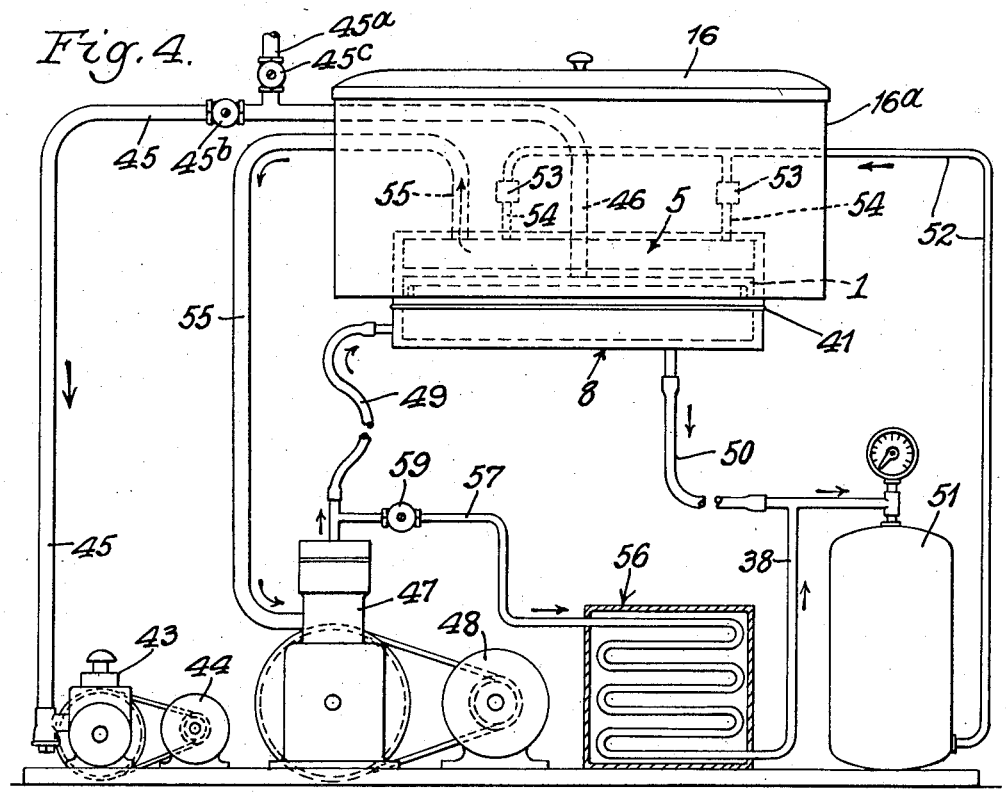
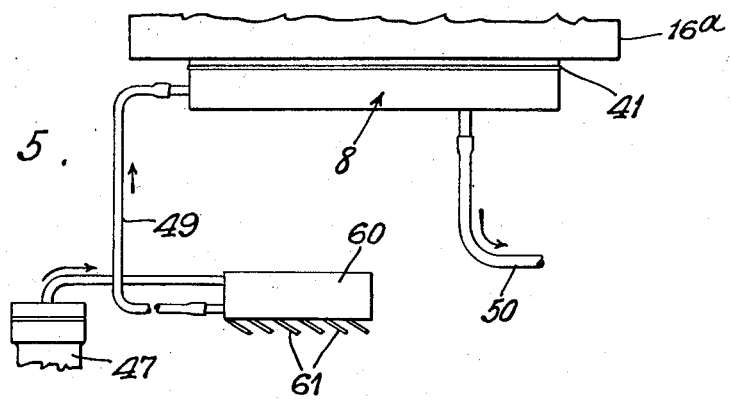

2,434,003

UNITED STATES PATENT OFFICE 2,434,003

VACUUM DESICCATING APPARATUS USING THE EVAPORATOR AND CONDENSER OF A REFRIGERATING DEVICE

Willard L. Morrison, Lake Forest, Ill.

Application December 21, 1942, Serial No. 469,671

4 Claims. (Cl. 34—76)

This invention relates to an apparatus and process for desiccating materials and has for its object to provide a new and improved apparatus and process of this description.

There are many materials, including solid material, juices, beverages, blood, etc., which suffer greatly when desiccated by the ordinary method. One of the objects of the present invention is to desiccate these materials so that when desiccated they retain the aroma, vitamins and other properties which they have in the natural state before desiccation.

The invention has as a further object to provide an apparatus and a process by which the material is heated to drive out the volatile content and simultaneously cooled to a low temperature to reduce the volatile content to a solid.

The invention has as a further object to provide an apparatus and process of this nature by means of which diffusion of the volatile content from the material being desiccated is prevented.

The invention has as a further object to provide an apparatus wherein there is a receiving chamber for the material to be treated with means for introducing therein and removing therefrom this material, wherein one wall of the chamber is formed by the evaporator of a mechanical refrigerating device and another wall of the chamber is formed by the condenser of a mechanical refrigerating device.

The invention has as a further object to provide an apparatus for desiccating materials, wherein there is a sealed chamber into which the material to be desiccated is received, with means for withdrawing air therefrom, two opposed walls of the chamber being formed by the evaporator and condenser of a mechanical refrigerating apparatus.

The invention has as a further object to desiccate such materials by means of a thermodynamic method.

The invention has as a further object to provide a means for desiccating materials, wherein these materials are treated in a receiving chamber having an upper and a lower wall, with means for heating one wall and cooling the other wall.

The invention has further objects which are more particularly pointed out in the accompanying description.

Referring now to the drawings,

Fig. 3 is an enlarged sectional view taken on line 3—3 of Fig. 1;

Fig. 4 is a view showing the entire device including the mechanical refrigerating apparatus and the air withdrawing apparatus;

Fig. 5 is a fragmentary view showing a modified construction.

Like numerals refer to like parts throughout the several figures.

Figure 1:
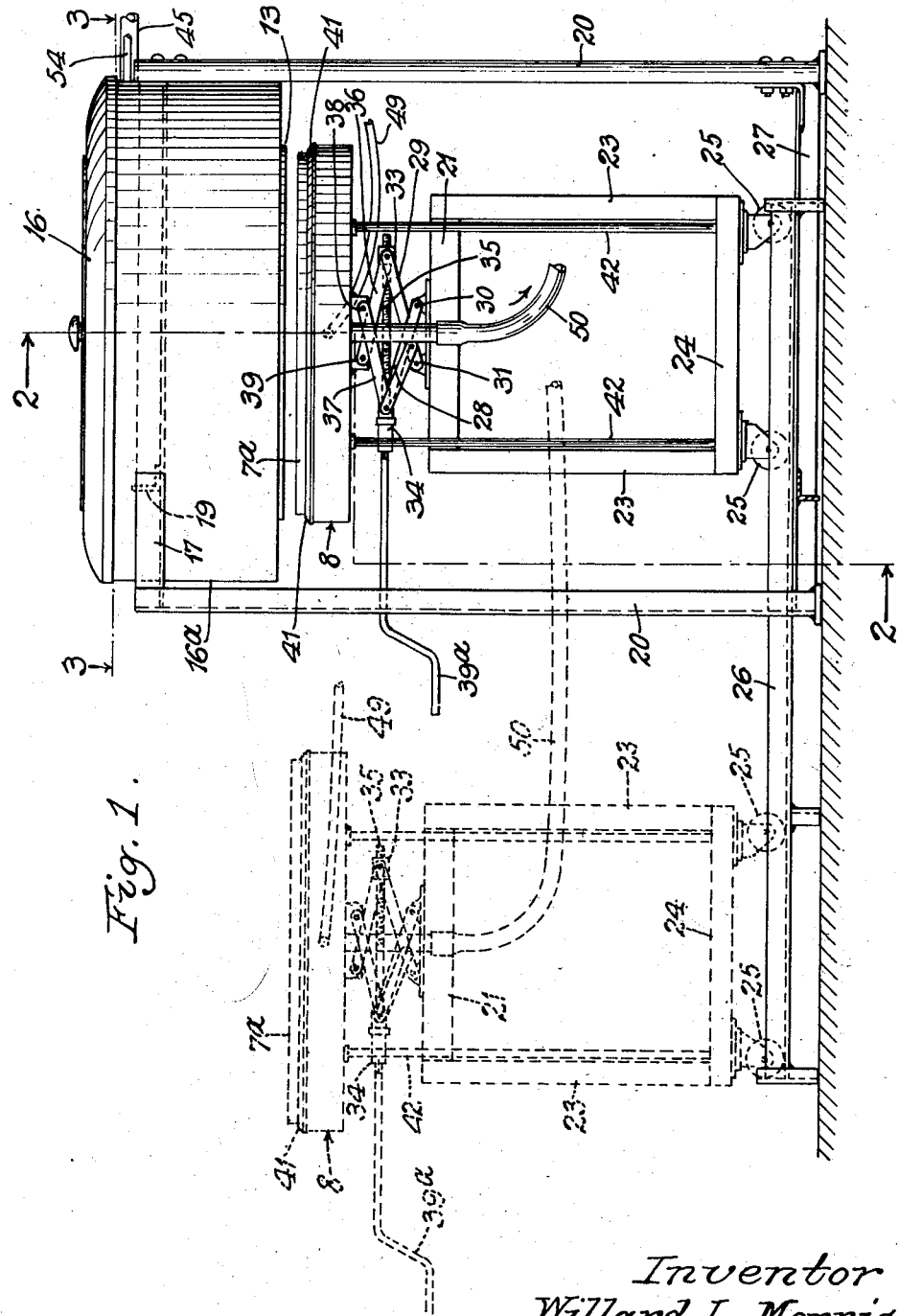
Fig. 1 is a side elevation showing one form of the apparatus.

In the construction shown, there is provided a receiving chamber 1 into which the material to be treated is placed. This material is defined by the surrounding upstanding member 7a and is in direct contact with the lower wall of the receiving chamber which is a primary heating surface. The upper wall 4 of the receiving chamber is a primary cooling surface preferably formed by one of the walls of the evaporator 5 of a mechanical refrigerating device. The space 6 above the wall 4 contains the cold gas from the mechanical refrigerating apparatus and the wall 4 is quickly brought to a very low temperature. The lower wall 7 of the receiving chamber is preferably formed by one of the walls of the condenser 8 of a mechanical refrigerating apparatus. The space 9 below the wall 7 contains the warm material which is usually in a condenser of this type. The lower wall 7 may be heated by any other suitable means.

There are bracing members 10 connecting the walls of the evaporator together and bracing members 11 connecting the walls of the condenser together. Above the evaporator there is provided suitable insulating material 12. The wall 13 of the evaporator is surrounded by the insulating material 14, such as rock wool. Above the insulating material 12 is a chamber 15 which contains some of the pipes and valves and which is also filled with insulating material. There is a removable cover 16 for this chamber 15.

An outer casing 16a encloses the evaporator and associated parts. The evaporator, the casing 16a and associated parts are preferably supported in a fixed position by means of a frame which consists of the members 17, 18 and 19 which are connected preferably in triangular form (Fig. 3). This frame is supported by suitable supports 20.

The condenser 8, receiving chamber 1 and associated parts are removably mounted in position. As herein shown, they are supported upon a support consisting of the members 21, 21a, 22, 23 and 24. The bottom member 24 is provided with rollers 25 which run on tracks 26 connected with the base 27 which is attached to the supports 20 and which extends out laterally therefrom so that the condenser and associated parts can be run out to one side as shown in Fig. 1.

To facilitate the insertion of the material into the receiving chamber 1 and removal of such material therefrom, the condenser 8 is connected with the supports 21, 22, etc., by means of a jack construction so that it can be lowered and disconnected from the fixed parts of the device when it is desired to move it to the position shown in Fig. 1. This jack device may be of any desired form and, as herein shown, consists of the members 28 and 29 which are pivoted at their ends 30 and 31 to the top member 21. Their other ends are pivoted to the members 33 and 34 which have a screw threaded connection with a threaded rod 35. Pivotally connected with these members 33 and 34 are other members 36 and 37 which have their other ends pivoted at 38 and 39 with the bottom of the condenser 8.

A crank 39a is connected with the threaded rod 35 so that the rod can be rotated to move the members 33 and 34 farther apart to lower the condenser and to move them closer together to lift the condenser into its operative position.

Some means is provided for insuring the sealing of the receiving chamber so that the air may be removed therefrom and the entrance of air into it may be prevented. To secure this result the evaporator and condenser are connected together so that the contraction of the evaporator due to the lowering temperature and the expansion of the condenser due to the rising temperature act to tighten the seal between them. One means for securing this result, as herein shown, consists of providing the engaging parts of the evaporator and the condenser with inclined faces 40 and 40a which are inclined from the other edges upwardly and inwardly and which engage an interposed sealing member 41. This sealing member is a heat insulator and is preferably of such material that the surfaces thereof are moved or displaced by the pressure on it. One material for the purpose consists of rubber not sufficiently vulcanized to prevent it from flowing under pressure. A simple device for this purpose consists of the rubber-covered insulating tape used to cover electric wire splices.

It will be seen that by this means the parts forming the joint between the evaporator and the condenser are crowded more closely together by the expansion and contraction thereof due to the temperature variations to which they are subjected and hence a hermetically sealed chamber is always insured.

When the condenser is moved down far enough so that it can be moved laterally out from under the compressor, it rests upon the supports 42. It is then rolled out to one side as indicated in Fig. 1.

Figure 2:
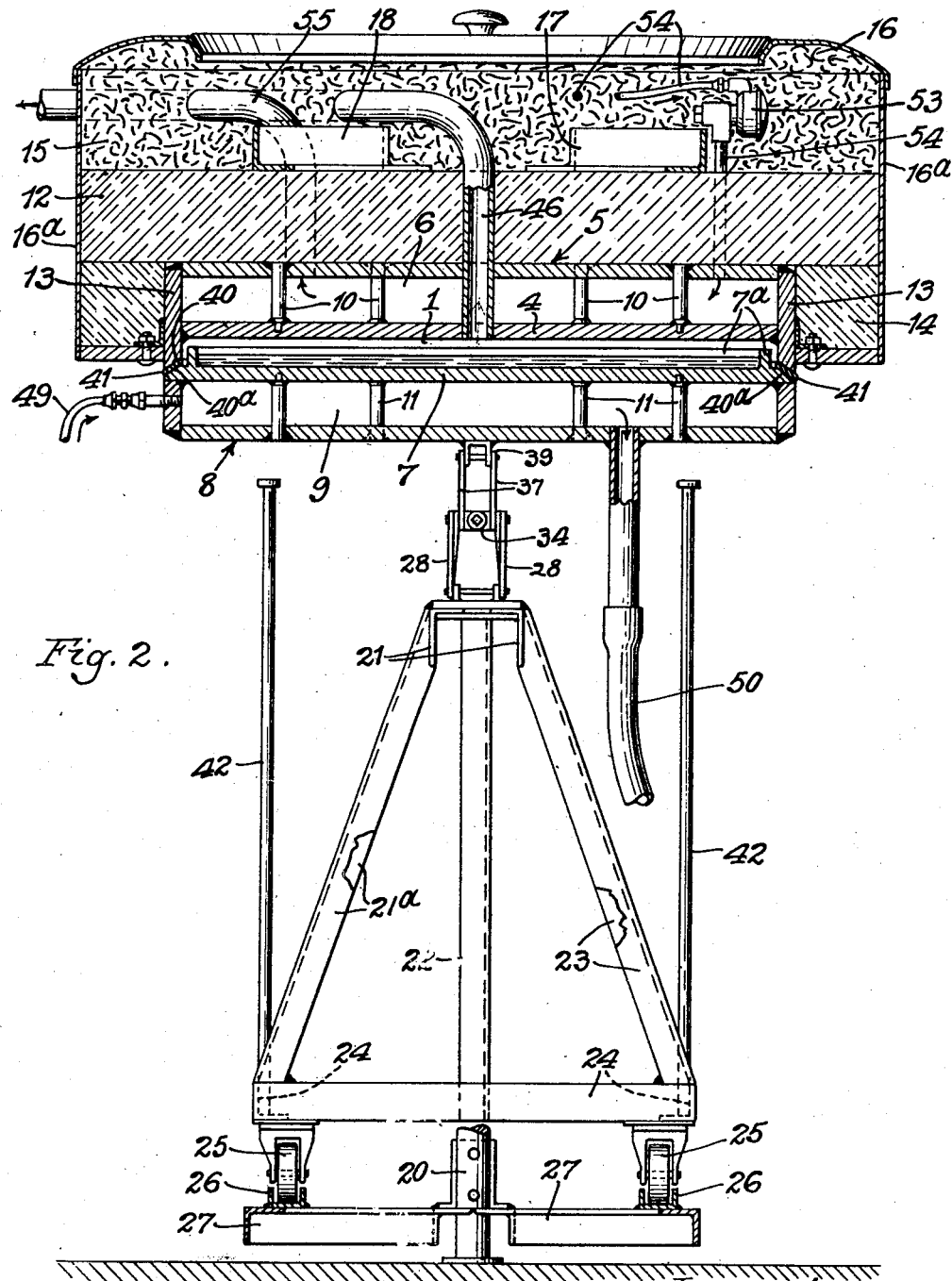
Fig. 2 is an enlarged sectional view taken on line 2—2 of Fig. 1.

The receiving chamber for the material to be treated may be arranged in any desired manner and is such that there is a considerable space above the uppermost part of the material, when it is in the receiving chamber, and the top wall of the receiving chamber. Some means is provided for withdrawing air from the receiving chamber. As herein shown, there is provided an air withdrawing pump or device 43 operated by a motor 44. A conduit 45 leads from the air withdrawing device to the receiving chamber and has an end 46 which connects with the receiving chamber (Figs. 2 and 4).

In Fig. 4 I have illustrated one form of the air moving device wherein there is a connection 45a for inserting carbon dioxide in the receiving chamber 1 when desired. This may be secured by closing the valve 45b and opening the valve 45c. When the desired vacuum is produced in the receiving chamber 1, this vacuum is held by closing the valves 45b and 45c.

In Fig. 4 I have also illustrated one form of mechanical refrigerating device which consists of a compressor 47 operated by a motor 48. The condenser 8 is connected to the compressor by a flexible pipe 49. A flexible return pipe 50 connects the condenser with the receiver 51. The receiver 51 is connected by a pipe 52 with one or more expansion valves 53 and these expansion valves are connected by pipes 54 with the evaporator 5. A return pipe 55 connects the evaporator with the compressor 47.

It will be noted that in this case the heat is secured from the condenser 8 of the refrigerating apparatus and the cold or low temperature is secured from the evaporator 5 of the refrigerating apparatus.

Some means is provided for regulating the heat supplied to the material in the receiving chamber. This result is secured by providing a bypass condenser 56 which is connected to the pipe 49 by the pipe 57 and to the receiver 51 by the pipe 58. There is a valve 59 in the pipe 57, by means of which the amount of refrigerant passing through the bypass may be controlled so as to control the heat delivered to the receiving chamber 1.

In Fig. 5 I have shown a modified construction where the bypass condenser 60 is provided with a series of hinged louvers 61. It will be seen that by moving these louvers to the open position, heat will be discharged into the atmosphere so that not so much will reach the receiving chamber 1. The degree of opening of the louvers may be controlled so as to secure any result desired.

In the use and operation of the device, the parts are arranged as shown in Fig. 2 with the material in the receiving chamber 1. Air is then exhausted from the receiving chamber above the material so as to produce the desired vacuum and this vacuum is held while the desiccating process is being carried on.

The mechanical refrigerating device produces a very low temperature in the evaporator 5, preferably minus 120 degrees Fahrenheit or lower. In this construction the upper wall of the receiving chamber is a primary cooling surface. Since the lower wall of the receiving chamber is heated, the vapor is driven off and goes straight up, striking the cold surface of the upper wall and is instantly congealed. When the proper amount of moisture has been removed, the condenser is lowered and moved out to one side and the dried material is removed. The congealed vapor on the upper wall, that is the ice thereon, is scraped off and the process is then repeated.

I claim:

1. An apparatus for desiccating materials comprising a hermetically sealed receiving chamber for the material to be treated, having an upper wall and a lower wall with a space between them to be partially filled with the material to be treated, the upper wall being formed by an evaporator of a mechanical refrigerating device and the lower wall being formed by the condenser of a mechanical refrigerating device, said mechanical refrigerating device including a compressor adapted to move a refrigerant through said condenser and said evaporator, and means for withdrawing air from the receiving chamber.

2. An apparatus for desiccating materials comprising a receiving chamber for the material to be treated, having an upper wall of a metal adapted to contract when its temperature is lowered and a lower wall with a receiving space between them for the material to be treated, a connection between said space and an air withdrawing device so that air may be withdrawn from said space, means for cooling the upper wall and heating the lower wall, sealing means between the two walls comprising opposed side walls connected with the upper and lower walls, said opposed side walls having inclined faces which are inclined from the outer edges upwardly and inwardly, an interposed sealing member engaged by said inclined faces, whereby the contraction of the upper wall when cooled causes the inclined faces to be moved more closely together to increase the sealing effect, and means constructed and adapted to hold the upper wall and lower wall together during the use of the apparatus.

3. An apparatus for desiccating materials comprising a receiving chamber for the material to be treated, having an upper wall of a metal adapted to contract when its temperature is lowered and a lower wall with a receiving space between them for the material to be treated, a connection between said space and an air withdrawing device so that air may be withdrawn from said space, means for cooling the upper wall and heating the lower wall, sealing means between the two walls comprising opposed side walls connected with the upper and lower walls, said opposed side walls having inclined faces which are inclined from the outer edges upwardly and inwardly, an interposed sealing member engaged by said inclined faces, said sealing member comprising rubber which flows under pressure, whereby the contraction of the upper wall when cooled causes the inclined faces to be moved more closely together to increase the sealing effect, and means constructed and adapted to hold the upper wall and lower wall together during the use of the apparatus.

4. In an apparatus, for desiccating materials, having a receiving chamber for the material to be treated, an evaporator forming a generally horizontal upper wall of said receiving chamber, a condenser forming an opposite generally horizontal lower wall, said condenser having a circumferential material retaining wall upwardly projecting therefrom into said receiving chamber the side walls of the chamber being in the form of an annular ring terminating in a surface extending outwardly and downwardly to engage terminal surfaces inclined inwardly and on the outer part of the condenser wall, adapted to form an open material receiving pocket, a compressor adapted to circulate a volatile refrigerant through said condenser and said evaporator, sealing means for closely sealing the space between said evaporator and condenser, and means for exhausting the receiving chamber between said evaporator and condenser.

WILLARD L. MORRISON.

REFERENCES CITED

The following references are of record in the file of this patent:

UNITED STATES PATENTS

| Number | Name | Date |
| --- | --- | --- |
| 2,284,913 | McComb | June 2, 1942 |
| 2,101,352 | Takenaga | Dec. 7, 1937 |
| 1,970,956 | Elser | Aug. 21, 1934 |
| 2,292,447 | Irwin | Aug. 11, 1942 |
| 1,325,271 | Adams | Dec. 16, 1919 |
| 2,374,232 | Pfeiffer | Apr. 24, 1945 |
| 1,482,049 | Swanson | Jan. 29, 1924 |

FOREIGN PATENTS

| Number | Country | Date |
| --- | --- | --- |
| 8,269 | Australia | July 14, 1932 |